No. 768,005. Patented August 16, 1904.

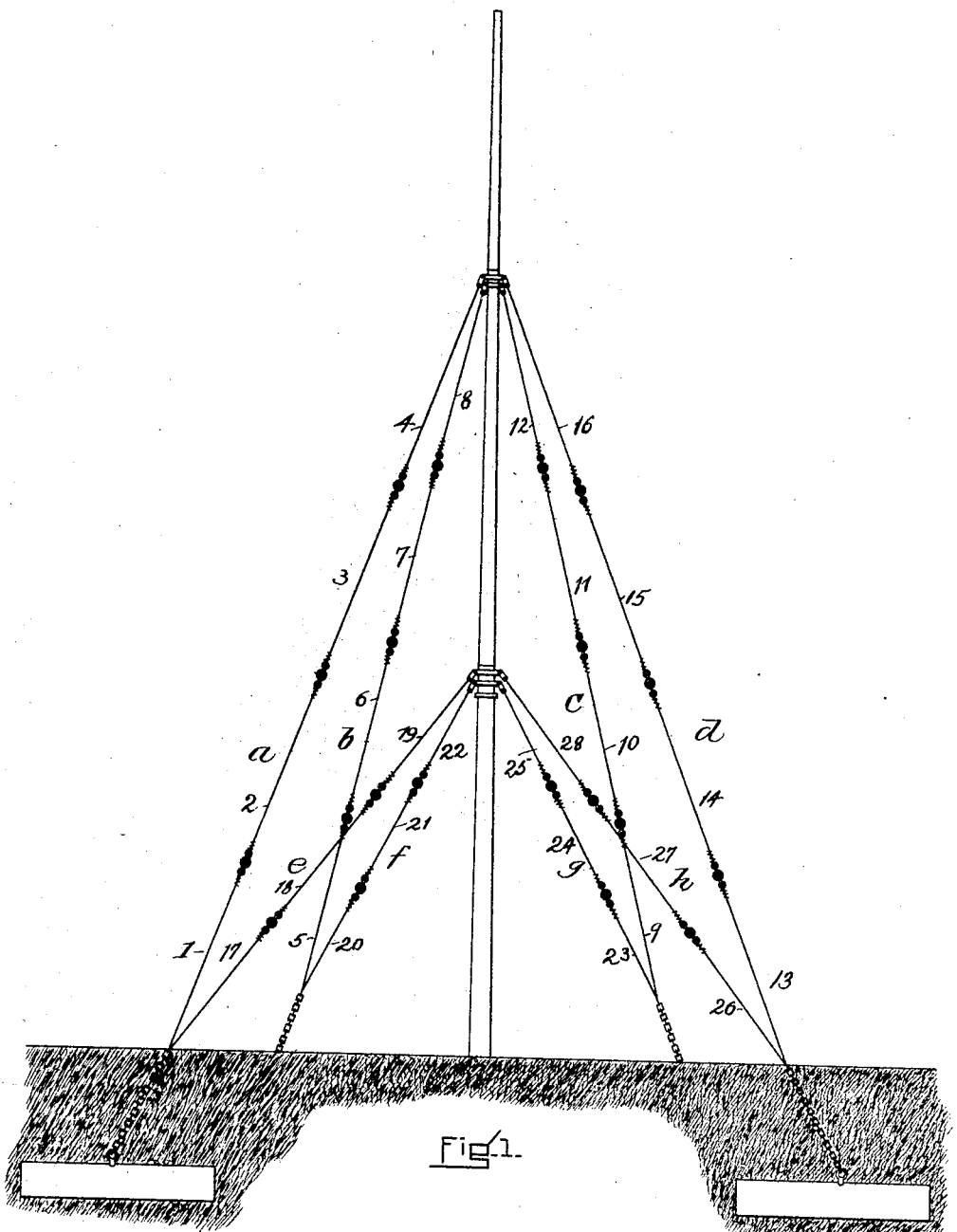

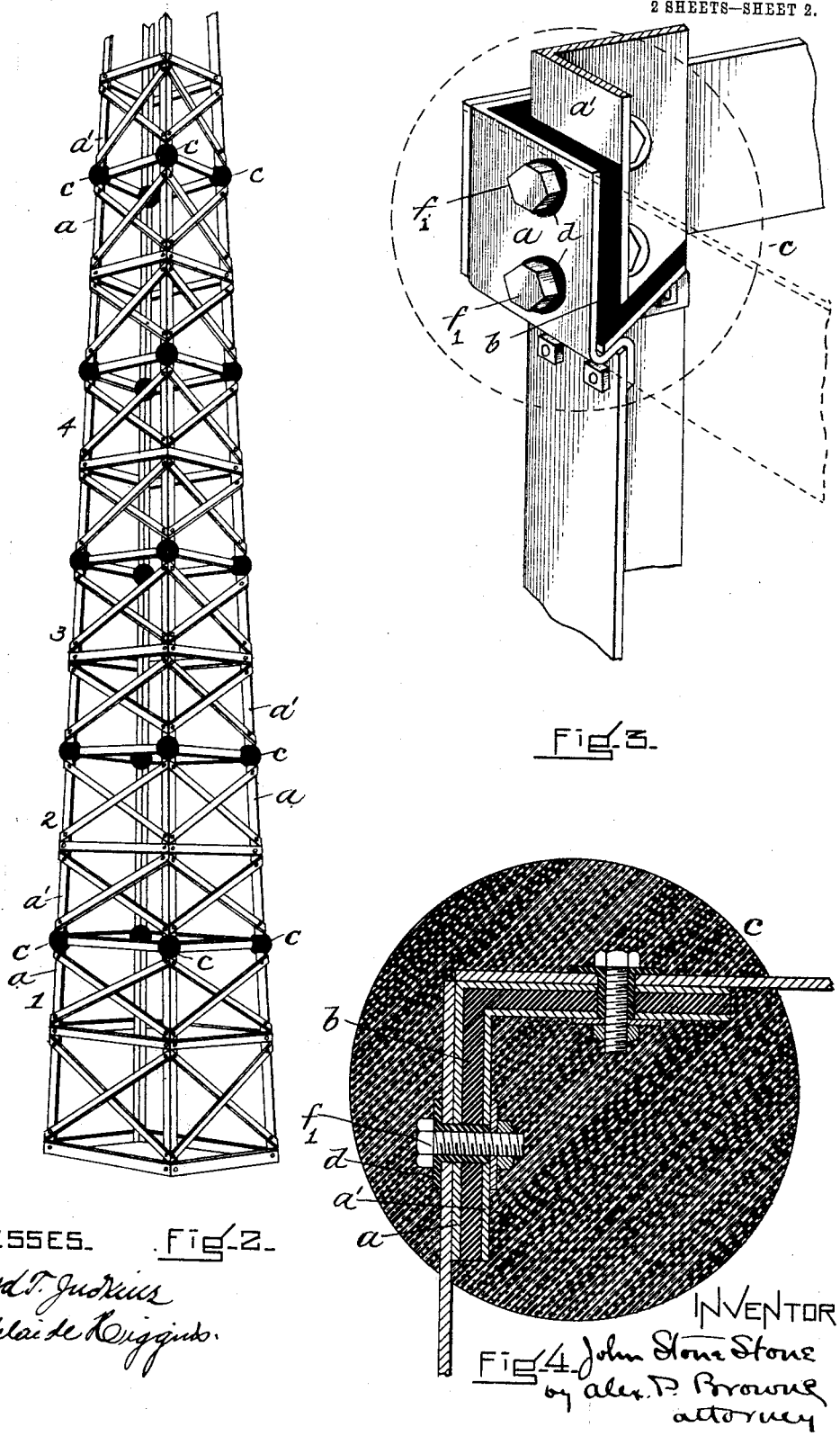

UNITED STATES PATENT OFFICE.

JOHN STONE STONE, OF CAMBRIDGE, MASSACHUSETTS, ASSIGNOR TO WILLIAM W. SWAN, TRUSTEE, OF BROOKLINE, MASSACHUSETTS.

SPACE TELEGRAPHY.

SPECIFICATION forming part of Letters Patent No. 768,005, dated August 16, 1904.

Application filed May 3, 1904. Serial No. 206,132. (No model.)

*To all whom it may concern:*

Be it known that I, JOHN STONE STONE, a citizen of the United States, and a resident of Cambridge, in the county of Middlesex and State of Massachusetts, have invented a certain new and useful Improvement in Space Telegraphy, of which the following is a specification.

In all practicable existing wireless-telegraph systems horizontally-polarized electromagnetic waves are employed—*i.e.*, waves in which the electric force is normal to the surface of the earth and the magnetic force is parallel to the surface of the earth. In such systems vertical elevated electric oscillators are used, sometimes consisting of a single wire, but more often of a number of parallel vertical elevated wires. In order to support these wires in an elevated position above the surface of the earth, it is usual to employ either a wooden mast or tower which is guyed and supported by metallic guy wires or ropes or a metal tower of sufficient strength to be self-supporting without being guyed. It has, furthermore, been customary to insulate the metallic supports, either the metal guy-ropes or the metal towers, at or near the point where they meet the earth's surface. Otherwise currents might be induced in the metallic guy or tower forming the support for the elevated conductor, which would tend to dissipate the energy of the waves and otherwise tend to disturb the operation of the vertical oscillator.

The object of the present invention is to provide means whereby the supports for the vertical oscillator may be so constructed that they shall be not only insulated from the earth, but also so that there shall be no metallically-continuous portion of the structure whose length shall be more than a small fraction of one-half the length of the waves to be radiated from the vertical oscillator.

The invention may best be understood by having reference to the drawings which accompany and form a part of this specification.

Figure 1 represents a wooden mast equipped with metallic guy-ropes, forming a support for a vertical oscillator. Fig. 2 represents a light iron tower structure utilized as a support for a vertical oscillator.

In the case of Fig. 1 the pole, being of wood, is itself an insulator, and the invention is applied solely to the guy-wires $a\ b\ c\ d\ e\ f\ g\ h$. The wire-guys are divided into sections 1 2 3 to 28, each section being so proportioned as to its length that it shall be but a small fraction of one-half of a wave length of the waves to be radiated from the vertical oscillator, and each section is insulated from the adjacent section or sections, preferably by what is known to the art as a "strain-insulator."

In Fig. 2 each joint of the tower is insulated, and the length of the steel sections between joints is made small compared to one-half of the wave length of the waves to be radiated from the vertical oscillator. The details of a preferred form of insulation of the joints referred to are shown in Figs. 3 and 4.

Fig. 3 is a horizontal section through one of the joints of the structure shown in Fig. 2. $a\ a'$ are two steel angle-irons. $b$ is a solid insulating-strip. $c$ is a spherical coating of insulating-cement.

Fig. 4 is another section through one of the joints of the structure shown in Fig. 2. In this figure the reference-letters $a$, $a'$, $b$, and $c$ have the same meaning as in Fig. 3. $d$ is an insulating-bushing whereby the bolts $f'$ are prevented from forming an electrical connection between the angle-irons $a\ a'$.

The theory underlying the structure described in this specification is as follows: Horizontally-polarized electromagnetic waves impinging upon a conductor having a component normal to the surface of the earth develop therein electromotive forces proportionate to the amplitude of the waves. If the length of said conductor be equal to one-half of the wave lengths of the waves, powerful electric oscillations will be set up in the conductor, and much of the energy of the waves impinging upon the conductor will be absorbed by the conductor and dissipated in the form of heat and radiated electromagnetic waves. If, however, the length of said conductor be less than one-half of the wave length of the electromagnetic waves impinging upon it, only oscillations of very small amplitude will thereby be developed in the conductor. These considerations have been so well understood for so many years that little further need be added to this description, except to point out that by insulating such conductor in such a manner as to divide it into sections of a length small compared to one-half of the wave length of the electromagnetic waves to be radiated in the vertical oscillator the possibility of setting up standing waves in these sections is minimized, and therefore such insulators as are placed in said conductor will be subject to much smaller electromotive force than would be the case if the length of said conductor were approximately such as would permit of the formation of standing waves in it. It therefore follows that by this construction not only is the energy of the waves to be radiated conserved, but also the difficulty of insulating the conductor forming a part of the support to the vertical oscillator is greatly diminished, and each insulated joint need have but a very small fraction of the dielectric strength which would be required by a single insulated joint in a section were the section such as to permit of the formation of standing waves.

I do not claim, broadly, the insulation of conductors forming a part of the support of vertical oscillators, but do claim—

1. A support for an elevated conductor or vertical oscillator, composed of sections of conducting material, each section having a length short as compared to one-half of the wave length of the electromagnetic waves to be radiated from said conductor or oscillator, said sections being insulated from each other.

2. A support for an elevated conductor or vertical oscillator consisting of a tower composed of sections of conducting material, each section having a length short as compared to one-half of the wave length of the electromagnetic waves to be radiated from said conductor or oscillator and means for insulating said sections from each other.

In testimony whereof I have hereunto subscribed my name this 2d day of April, 1904.

JOHN STONE STONE.

Witnesses:
BRAINERD T. JUDKINS,
G. ADELAIDE HIGGINS.